(12) United States Patent
Zevatsky

(10) Patent No.: US 6,955,054 B2
(45) Date of Patent: Oct. 18, 2005

(54) METHOD AND DEVICE FOR COOLING A WORKING MEDIUM AND METHOD FOR GENERATING A MICROWAVE EMISSION

(75) Inventor: Yury Eduardovich Zevatsky, Kiev (UA)

(73) Assignee: Marina Nikolaevna Khanzhina, Saint-Petersburg (RU)

( * ) Notice: Subject to any disclaimer, the term of this patent is extended or adjusted under 35 U.S.C. 154(b) by 13 days.

(21) Appl. No.: 10/475,088

(22) PCT Filed: Feb. 15, 2002

(86) PCT No.: PCT/RU02/00053

§ 371 (c)(1),
(2), (4) Date: Oct. 24, 2003

(87) PCT Pub. No.: WO02/103261

PCT Pub. Date: Dec. 27, 2002

(65) Prior Publication Data

US 2004/0148944 A1 Aug. 5, 2004

(30) Foreign Application Priority Data

Jun. 14, 2001 (RU) ........................................ 2001116712

(51) Int. Cl.[7] ............................ F25B 21/00; H05B 6/64; H05B 6/80; H05B 31/26; H01J 7/24
(52) U.S. Cl. ........................ 62/3.1; 219/679; 219/687; 315/111.01
(58) Field of Search .............................. 62/3.1; 219/679, 219/687, 688; 315/111.01, 112

(56) References Cited

U.S. PATENT DOCUMENTS

| | | | |
|---|---|---|---|
| 3,638,440 A | * | 2/1972 | Lawless ........................ 62/3.1 |
| 3,650,117 A | | 3/1972 | Robinson et al. ................. 62/3 |
| 4,136,525 A | * | 1/1979 | Van Vechten ................. 62/3.1 |
| 5,177,970 A | * | 1/1993 | Chang ........................... 62/3.1 |
| 5,463,868 A | * | 11/1995 | Peschka et al. ................... 62/6 |
| 5,699,668 A | * | 12/1997 | Cox .............................. 62/3.1 |

FOREIGN PATENT DOCUMENTS

| | | |
|---|---|---|
| RU | 2080746 C1 | 5/1997 |
| SU | 840621 | 6/1981 |
| SU | 853316 | 8/1981 |

OTHER PUBLICATIONS

Brodyansky et al, Kholodilnaya Tekhnika, 1982, No. 7, pp. 24–29, O vozmozhnosti sozdaniya kholodilnykh ustanovok na . . . .

Big Encyclopedia Polytechnic Dictionary, Scientific Publishers, Moscow, 1998, p. 585.

Minkin et al, Dipole Moments in Organic Chemistry, L., Chemistry 1968, p. 248–249.

* cited by examiner

Primary Examiner—William C. Doerrier
(74) Attorney, Agent, or Firm—Jacobson Holman PLLC

(57) ABSTRACT

The invention relates to thermal physics, in particular to a method and apparatus for cooling a working medium and a method for generating microwave radiation. The object is to reduce the power consumed in the cooling process and in the conversion of electric power into electromagnetic radiation energy. A working medium, molecules of which exhibit a stable dipole moment, is placed into a closed working zone of electrical field effect, the electric field having an intensity satisfying the condition:

$$\mu E > 10^7 \text{ D V/m}$$

where: $\mu$ is the dipole moment of the working medium molecules, in Debyes (D), E is the electric field intensity, in V/m; and passage of electric current is prevented through the closed working zone. In generation of microwave radiation, exit of the microwave radiation is provided from the closed working zone of electric field effect, and heat is removed through absorption of the microwave radiation by an external coolant.

10 Claims, 14 Drawing Sheets

METHOD AND DEVICE FOR COOLING A WORKING MEDIUM AND METHOD FOR GENERATING A MICROWAVE EMISSION

This is a nationalization of PCT/RU02/00053 filed Feb. 15, 2002 and published in Russian.

FIELD OF THE INVENTION

The present invention relates to thermal physics, in particular to a method and apparatus for cooling a working medium and a method for generating microwave radiation, and can be employed in designing refrigerators, microwave radiation generators and heat engines.

BACKGROUND OF THE INVENTION

Refrigerating machines based on a method of artificially cooling a working medium by a supplied energy are widely known (see Big Encyclopedic Polytechnic Dictionary, Scientific Publishers "Big Russian Encyclopedia", Moscow, 1998, p. 585). Conventional apparatuses used for these purposes include compression refrigerating machines using compression of a coolant, heat-employing refrigerating machines consuming thermal energy, and thermoelectric refrigerating machines using the Peltier effect.

However, the conventional method and apparatus for cooling a working medium are incapable of attaining high efficiency factors and consume a considerable amount of an externally supplied energy.

Another problem with the conventional method and apparatus for cooling a working medium is that they cannot be used as a microwave radiation source.

A method is known for generating microwave radiation and cooling, and a microwave oven/refrigerator apparatus operates as both a microwave source, e.g. a microwave heating oven, and a refrigerator (see RF Patent No. 2080746 of Dec. 28, 1992).

The oven/refrigerator apparatus comprises a working compartment, a magnetron including a cooling device and connected to the working compartment through a length of coaxial line with a microwave source at the end, wherein the cooling device is a forced ventilation air duct, and a magnetron and a radiator are accommodated in the air duct, the air duct communicates with the working compartment through a controlled plug, a thermal cell is arranged outside the working compartment on one of the walls thereof and connected to a power supply having a switch. The thermal cell comprises solid-state electronic microcoolers mounted on the radiator.

The apparatus operation as a refrigerator is provided by the use of the solid-state electronic microcoolers, such as ceramic heat transitions connected to alternating semiconductor p- and n-elements integrated in one housing, operating on the basis of the Peltier effect according to which heat absorption or release, i.e. cooling or heating of the transition, depends on the direction of electric current flowing through the transition.

However, problems exist with the prior art method and apparatus for cooling a working medium in that they are incapable of attaining high efficiency factors and consume a considerable amount of externally supplied power.

The method for generating microwave radiation has a low factor of conversion of electric power into radiation energy.

SUMMARY OF THE INVENTION

The object of the present invention is to provide a method and apparatus for cooling a working medium, which ensure reduced power consumption in the cooling process. Another object of the invention is to provide a method for generating microwave radiation, which ensures reduced power consumption for the conversion of electric power into electromagnetic radiation energy.

The above objects are attained in a method for cooling a working medium in accordance with the present invention, comprising the steps of: placing a working medium, molecules of which exhibit a stable dipole moment, into a closed working zone of electrical field effect, the electric field having an intensity satisfying the condition:

$$\mu E > 10^7 \text{ D V/m}$$

where: $\mu$ is the dipole moment of the working medium molecules, in Debyes (D), E is the electric field intensity, in V/m; and wherein electric current is prevented from passing through the closed working zone of electric field effect.

The working medium is preferably gas or liquid.

The working medium can be supplied to the closed working zone of electric field effect either periodically, the working medium being held in and then removed from the closed working zone, or continuously, the working medium being with continuously removed from the closed working zone; after removing from the closed working zone of electric field effect, the working medium is heated through heat exchange with the environment and then returned into the closed working zone of electric field effect.

The working medium in a gaseous form can be placed into the closed working zone of electric field effect at a temperature of over 100° K. under a pressure not exceeding the pressure magnitude at which the working medium condenses, preferably under normal conditions, including temperature and pressure of the environment.

Passage of electrical current through the closed working zone of electric field effect is prevented by isolating structural components, to which a potential difference is applied to generate electrical field, from the working medium and from each other.

When the working medium is a liquid, electric field can be generated in a double electric layer at the interface between the working medium and the structural components of the closed working zone.

The above object is further attained in an apparatus for cooling a working medium in accordance with the present invention, comprising: a chamber for placing a working medium, molecules of which exhibit a stable dipole moment, said chamber including potential difference applying units for applying a potential difference to generate electric field in the chamber, said electric field having an intensity satisfying the condition:

$$\mu E > 10^7 \text{ D V/m}$$

where $\mu$ is the dipole moment of the working medium molecules, in Debyes (D), E is the electric field intensity, in V/m;

working medium supply means connected to the chamber; working medium removal means connected to the chamber, and a high voltage source connected to the potential difference applying units.

Units for applying the potential difference with negative sign are preferably plates of a conducting material, having an insulating coating, in particular, plates with rounded corners and a polished surface.

The high voltage source is adapted to generate a constant or variable potential difference.

The chamber is made of a chemically inert dielectric, and the working medium is gas or liquid, the working medium removal means being connected to the working medium supply means through a heat exchanger.

The above technical result is further attained in a method for generating microwave radiation in accordance with the present invention, comprising the steps of: placing a working medium, molecules of which exhibit a stable dipole moment, in a closed working zone of electrical field effect, the electric field having an intensity satisfying the condition:

$$\mu E > 10^7 \text{ D V/m}$$

where: $\mu$ is the dipole moment of the working medium molecules, in Debyes (D), E is the electric field intensity, in V/m;

wherein electric current is prevented from passing through the closed working zone, exit of microwave radiation is provided from the closed working zone, and heat is removed through absorption of the microwave radiation by an external coolant.

The present invention is based on the following theoretical backgrounds.

When a working medium, molecules of which exhibit a stable dipole moment $\mu$ that is not provided by electron polarizability, is placed in an electric field having intensity E, in the absence of electric current provided by said field in the working medium, thermodynamic equilibrium of the working medium shifts towards reduction of its temperature relative to that of the environment. When the condition $\mu \cdot E > 10^7$ D V/m is met, steady cooling of the working medium by a value of over 0.02° C. is observed. The working medium cooling effect or the working medium thermodynamic equilibrium shift towards reduction of temperature relative to the environment temperature is provided by the Stark effect (see Minkin V. I. et al. Dipole Moments in Organic Chemistry, L., Chemistry, 1968, p. 248).

As known, the absorption spectrum of a substance having a dipole moment and being in a gaseous state, when the substance is placed in electric field, changes as follows: the lines corresponding to rotational energy level transitions of molecules disintegrate into absorption bands symmetrical to the original maximum, the total area of the absorption bands being approximately equal to the area of the original band. The disintegration amount is the greater, the greater the intensity of the field and the dipole moment of the molecule. According to the law of thermal radiation, the radiation spectrum of the working medium must also exhibit disintegration of bands at the Stark wavelengths.

According to the Shannon formula, radiation entropy depends on the radiation spectrum and is the greater, the greater the number of bands in the spectrum. Therefore, when a working medium is placed in electric field, thermodynamic equilibrium should be shifted as the result of increase in the entropy carried away by heat radiation from the working medium. If the working medium radiation will be to some extent picked up by the environment through a coolant, followed by withdrawal of the coolant, cooling of the working medium can be used to provide a primary circuit of a thermal machine to do a work.

BRIEF DESCRIPTION OF THE DRAWINGS

The present invention will become more apparent by describing in detail the preferred embodiments of the present invention with reference to the attached drawings in which.

EMBODIMENTS OF THE INVENTION

Exemplary embodiments of the present invention will be described in detail referring to the attached drawings.

Figure 1:
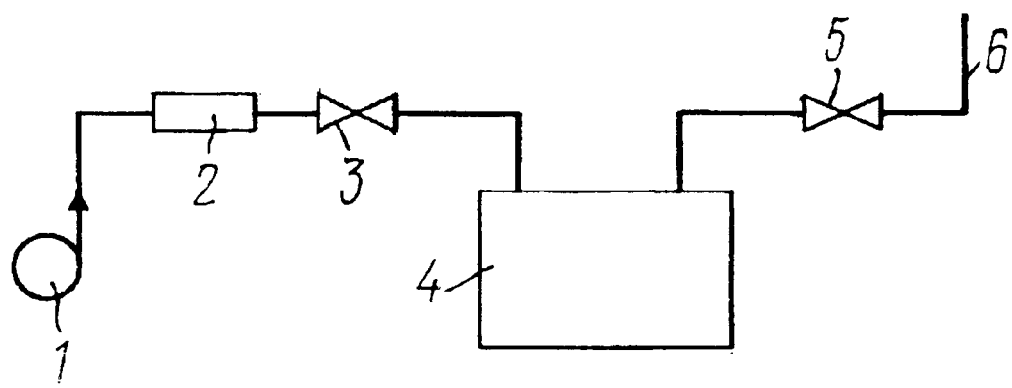
FIG. 1 is a schematic view of an apparatus for cooling a working medium, with periodic supply of the working medium.

FIG. 1 shows a flask with a compressed air (working medium), or a gasometer 1 (depending on whether the working medium is prepared or produced before the cooling process) for delivery of the working medium to a working chamber 4 by excessive pressure via a gate 3 and a volume flow counter 2. Then the working medium exits the working chamber through a branch pipe 6 with a gate 5 to a ventilation draught. Once the amount of the working medium equal to 20–40 volumes of the working chamber have passed through, the gates 3 and 5 are closed and a potential difference is applied to the working chamber 4 whose electric circuit is shown in FIG. 4.

Figure 2:
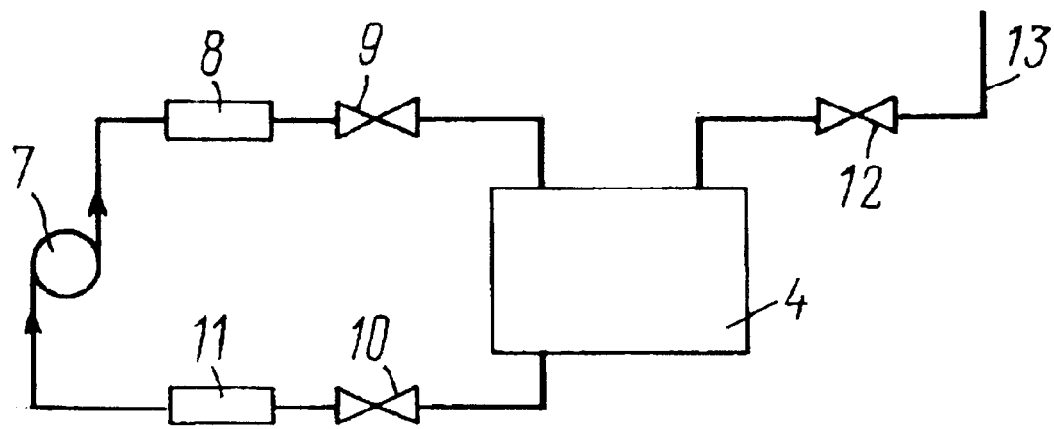
FIG. 2 is a schematic view of an apparatus for cooling a working medium, with continuous supply of the working medium.

FIG. 2 shows a seven-membrane pump with a buffer reservoir for a working medium, which supplies the working medium through a volume flow counter 8 and a gate 8 into the working chamber 4. Then the working medium exits the working chamber through a branch pipe via a gate 10 and air cooler 11 and enters a buffer reservoir of the membrane pump. A potential difference is applied to the chamber 4 whose electric circuit is shown in FIG. 4. To release excessive pressure in the system, the working medium is discharged through a gate 12 over a branch pipe 13 to the ventilation draught.

Figure 3A:
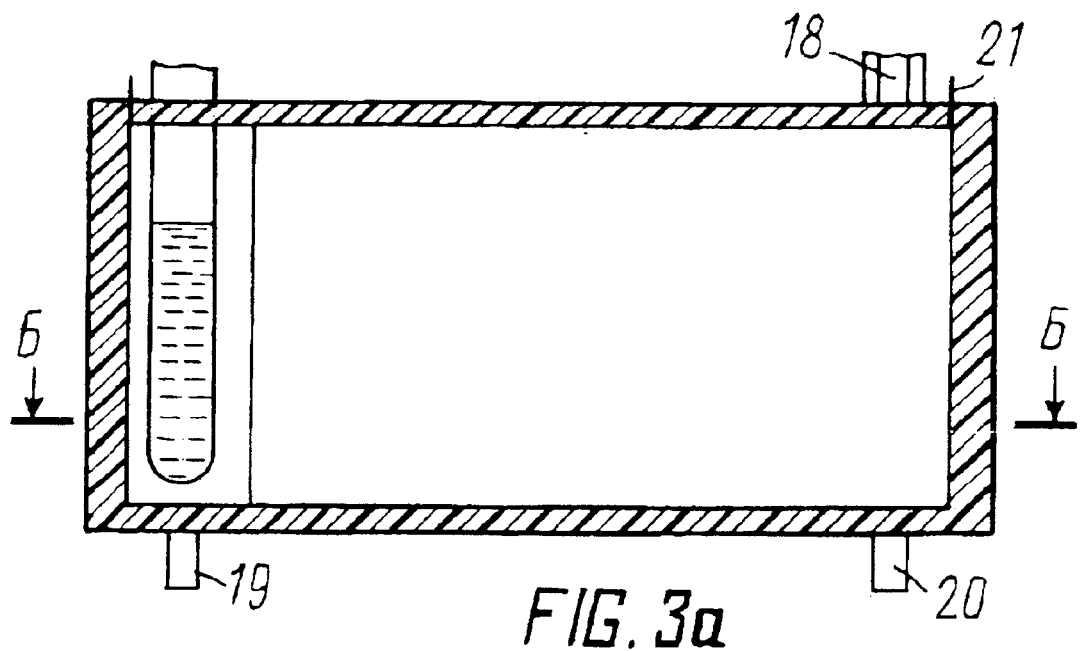
FIG. 3 is a simplified view of a pilot plant for testing the effect of cooling a working medium.
Figure 3B:
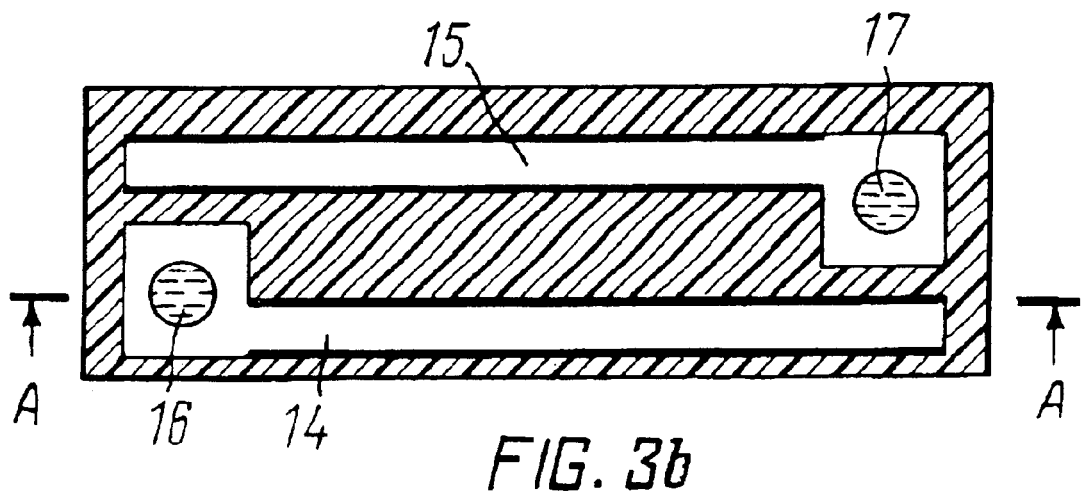

FIG. 3 shows a working cell 14, a comparison cell 15, a Beckman thermometer 16, 17 or a TP, a capillary 18 for supplying the working medium into the working cell, a capillary 19 for withdrawal of the working medium from the working cell, a capillary 20 for supplying the working medium into the comparison cell, and a contact 21 between a conducting foil in the working cell and a high voltage source.

Figure 4:
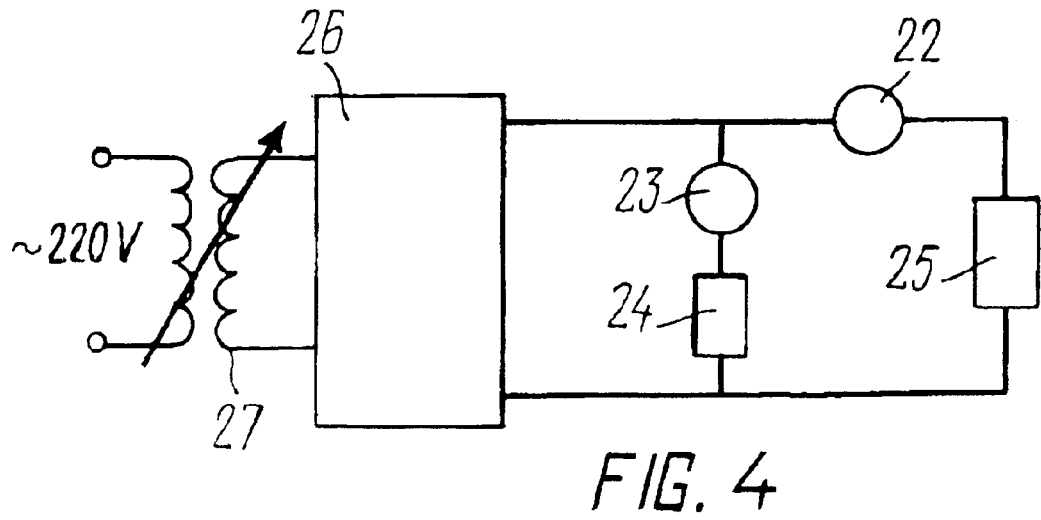
FIG. 4 is an electric circuit of the plant according to FIG. 3.

FIG. 4 shows a measuring head 22 (M24), a galvanometer 23 (M 193/3), a resistance 24 (R=33.6 GOhm), a pilot plant 25 in a heat-insulating casing; a voltage multiplier 26, and an electric supply 27.

The invention has been tested experimentally. Operations for determining thermal effects were carried out at a plant illustrated in FIG. 3. A working medium was pre-pumped through the cells 14 and 15 in the amount approximately equal to 20 volumes of the cell. Then the cells were sealed, and temperature was measured by TP thermometers or Beckman thermometers with 0.01° C. divisions. Upon reaching an approximately constant difference between readings of the thermometers 16 and 17, but not earlier than after 30 minutes, voltage was connected to the cell referred to as the working one, from a high voltage source 26. In the absence of current in the circuit, measured by a measuring head 22 (in the range of 0–50 mA, with 1 mA divisions), temperatures in the working cell and the comparison cell were measured during 30 minutes at a constant value of the applied voltage monitored by a galvanometer 23 with the $1.6 \cdot 10^{-9}$ division, connected via resistances 24 in a parallel circuit. After 30 minutes, voltage at the working cell was altered, and temperature was measured in both of the cells. After 30 minutes, voltage was disconnected from the working cell, and temperature measurements were repeated in the two cells in the absence of voltage. The results were processed as follows: a calibration difference was determined in the idle test (before connecting voltage) throughout the region with a maximum constant value of difference between temperatures in the working and comparison cells.

$$\Delta T_{calibr} = T^{It}_w - T^{It}_{comp}$$

Then the temperature values in the comparison cell ($T_{comp}$) were reduced to a reduced value by the formula:

$$T_{red} = T_{comp} + \Delta T_{calibr}$$

The obtained values of reduced temperatures in the comparison cell and the working cell were plotted (see example below). By the reduced plots, a thermal effect value, $\Delta T = T_{red} - T_w$ was determined (at the same time value τ).

Three tests with different values of voltage (10 kV, 20 kV, 30 kV) at the working cell along with the idle test formed a first set of experiments relating to the same working medium—chloroethane (dipole moment 1.9 D) at different orientations of the plant in the lab and alternate positions of the thermometers.

In all sets of experiments a positive thermal effect, $\Delta T > 0$, was observed, which became more stable as the voltage increased at the working cell. At 10 kV ($\mu E = 3.6 \cdot 10^6$ D·V/m), the $\Delta T$ value was comparable with the measurement instrument error $\Delta T_{error} = 0.005°$ C. At 30 kV ($\mu E = 1.08 \cdot 10^7$ D·V/m), the $\Delta T$ value was about 0.02–0.04° C., which appreciably exceeded the instrument error. The positive $\Delta T$ value evidenced that in the presence of electric field, equilibrium in the working cell shifted towards cooling as compared to equilibrium in the comparison cell.

Plots in FIGS. 5 to 13 show results of three series of experiments using the same working medium. The working medium was chloroethane obtained from the reaction between diethyl sulfate and saturated NaCl solution. The gas was passed through a flask with sulfur acid for drying.

Figure 5A:
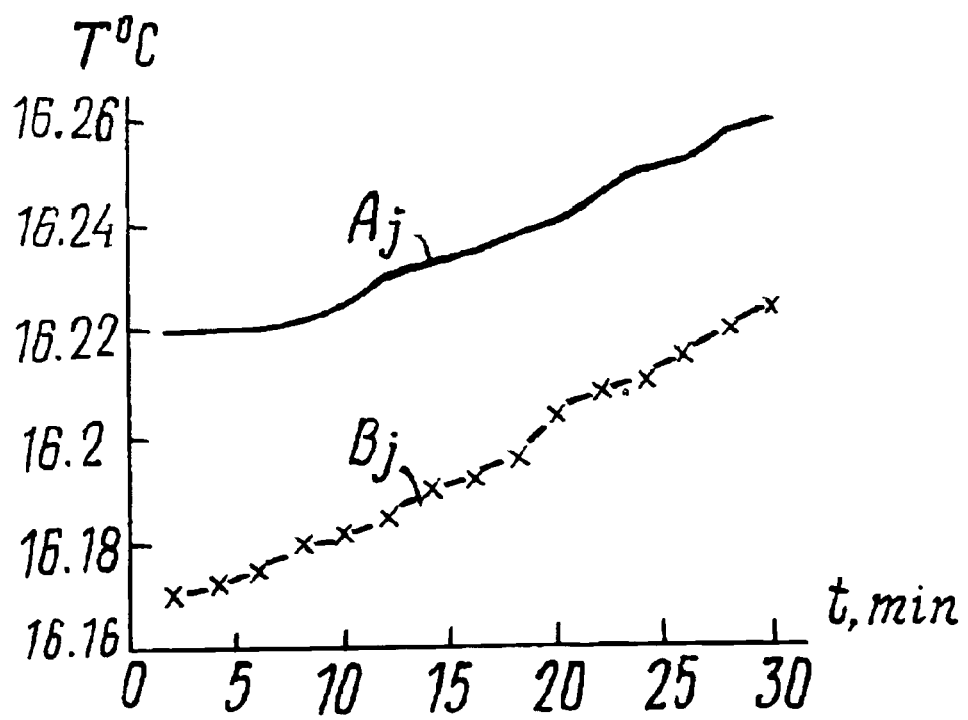
FIGS. 5 to 13 are plots illustrating experimental testing of the invention.

FIG. 5a illustrates Test 1.1 without application of voltage, wherein A is the temperature in the working cell; B is the temperature in the comparison cell.

Figure 5B:
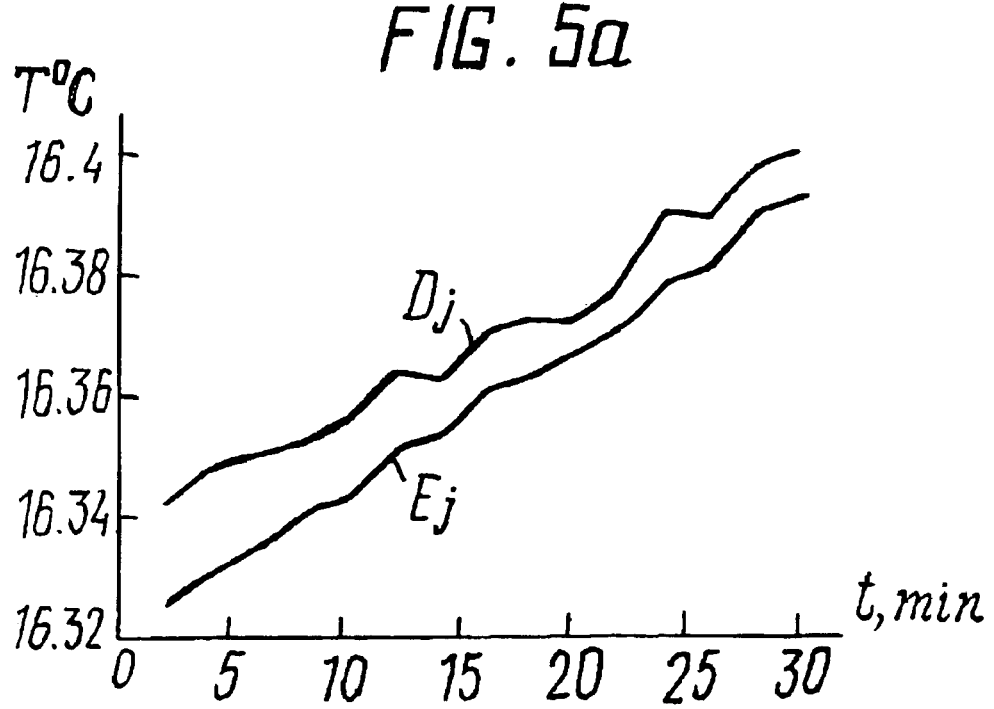

FIG. 5b illustrates Test 1.2 with application of 10 kV voltage, $\mu E = 3.6 \cdot 10^6$ D·V/m. Here D is the temperature in the working cell, E is the temperature in the comparison cell.

Figure 5C:
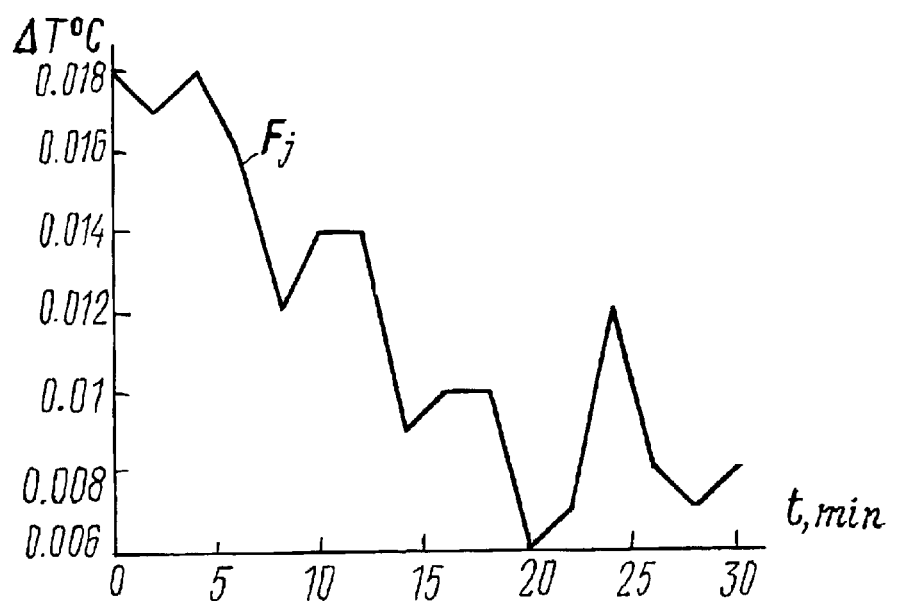

FIG. 5c shows a plot of $\Delta T = T_{comp} - T_w$.

Test 2.1 without application of voltage corresponds to the plot in FIG. 5a.

Figure 6A:
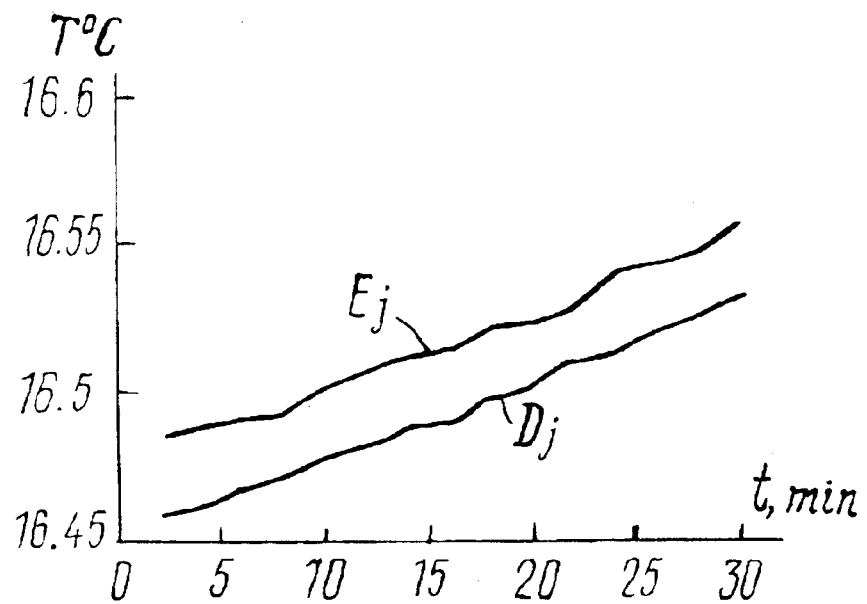

FIG. 6a illustrates Test 2.2 with application of 20 kV voltage, $\mu E = 7.2 \cdot 10^6$ D·V/m. Here D is the temperature in the working cell, E is the temperature in the comparison cell.

Figure 6B:
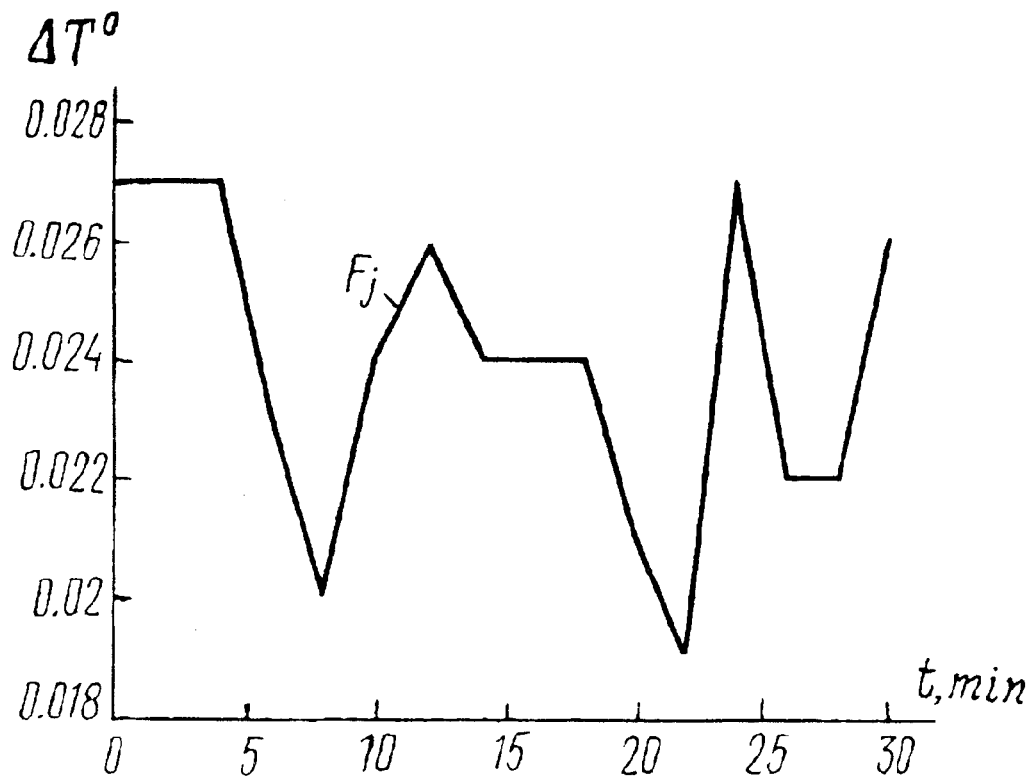

FIG. 6b is a plot of $\Delta T = T_{comp} - T_w$.

Test 3.1 without application of voltage corresponds to the plot in FIG. 5a.

Figure 7A:
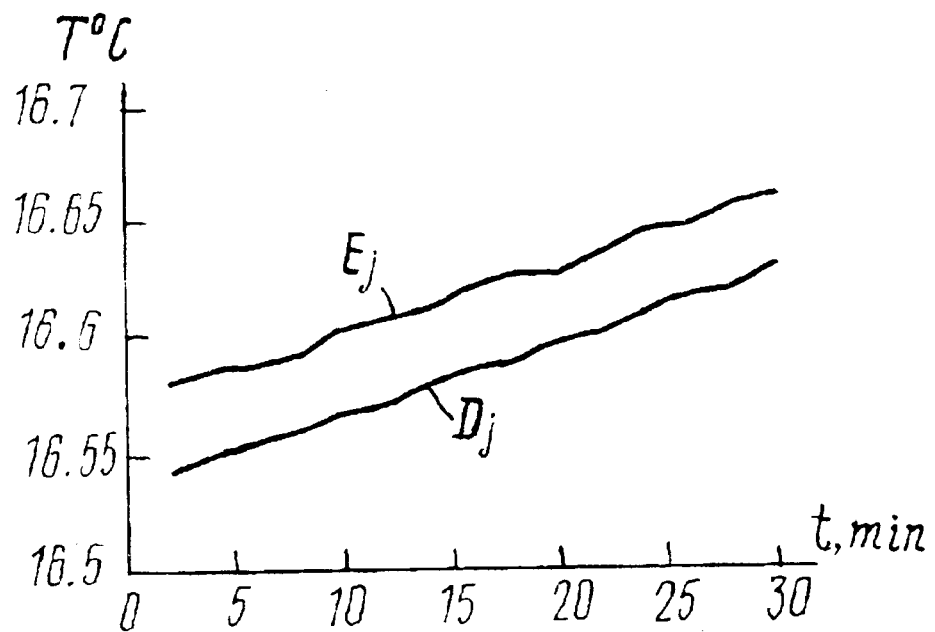

FIG. 7a illustrates Test 3.2 with application of 30 kV voltage, $\mu E = 1.08 \cdot 10^7$ D·V/m. Here D is the temperature in the working cell, E is the temperature in the comparison cell.

Figure 7B:
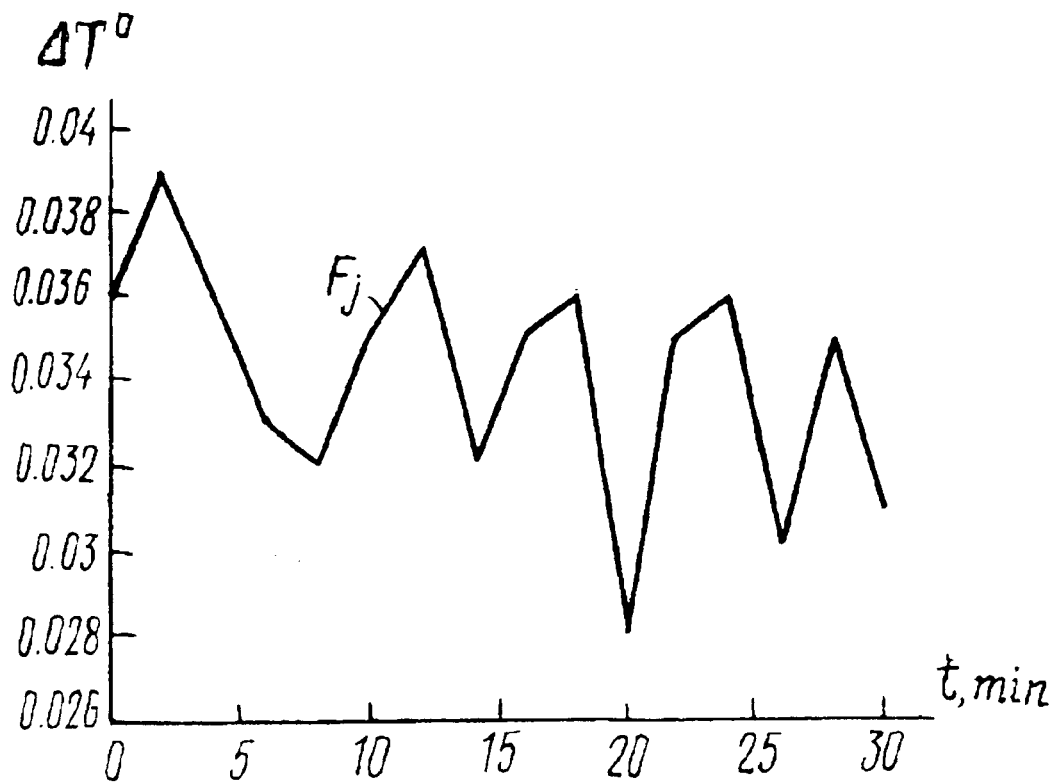

FIG. 7b is a plot of $\Delta T = T_{comp} - T_w$.

In tests 4–8, the cell was turned at 180° relative to the preceding position.

Figure 8A:
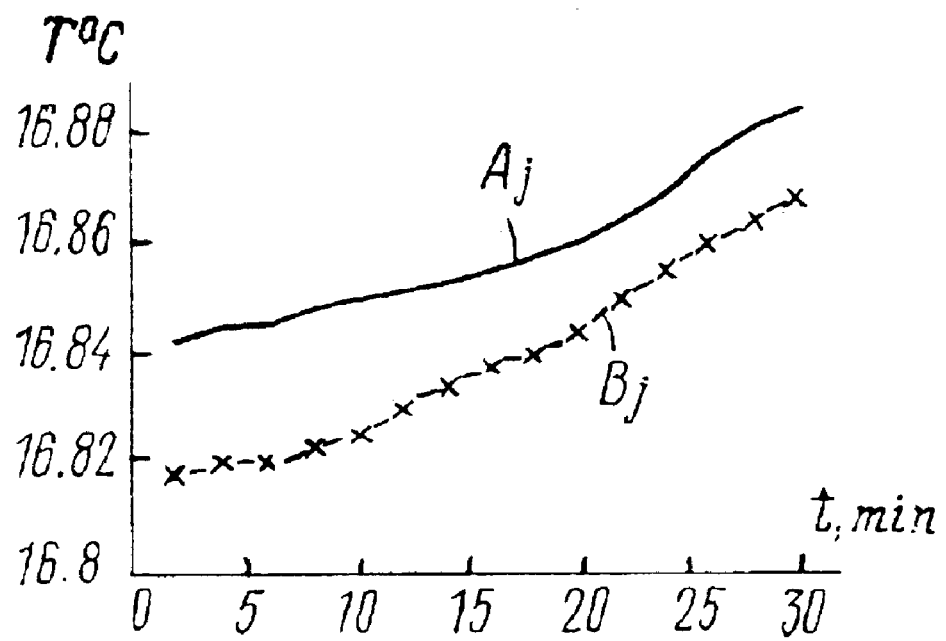

FIG. 8a illustrates Test 4.1 without application of voltage. Here A is the temperature in the working cell, B is the temperature in the comparison cell.

Figure 8B:
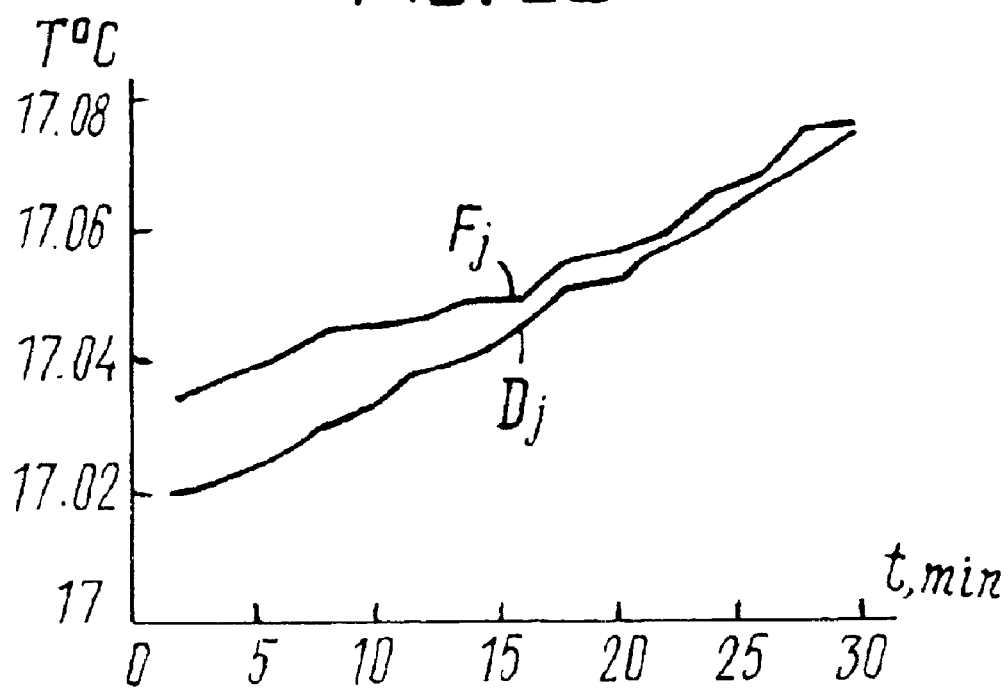

FIG. 8b illustrates Test 4.2 with application of 10 kV voltage, $\mu E = 3.6 \cdot 10^6$ D·V/m. Here D is the temperature in the working cell, E is the temperature in the comparison cell.

Figure 8C:
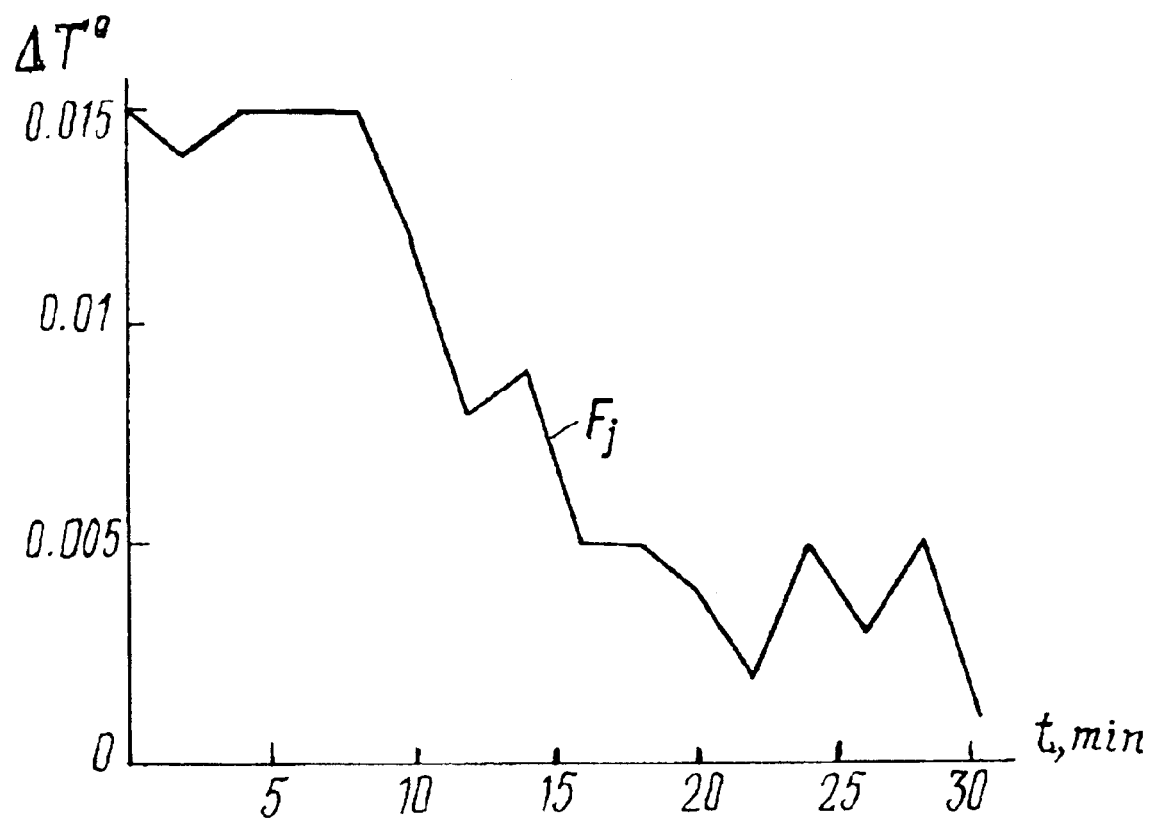

FIG. 8c is a plot of $\Delta T = T_{comp} - T_w$.

Test 5.1 without application of voltage corresponds to the plot in FIG. 8a.

Figure 9A:
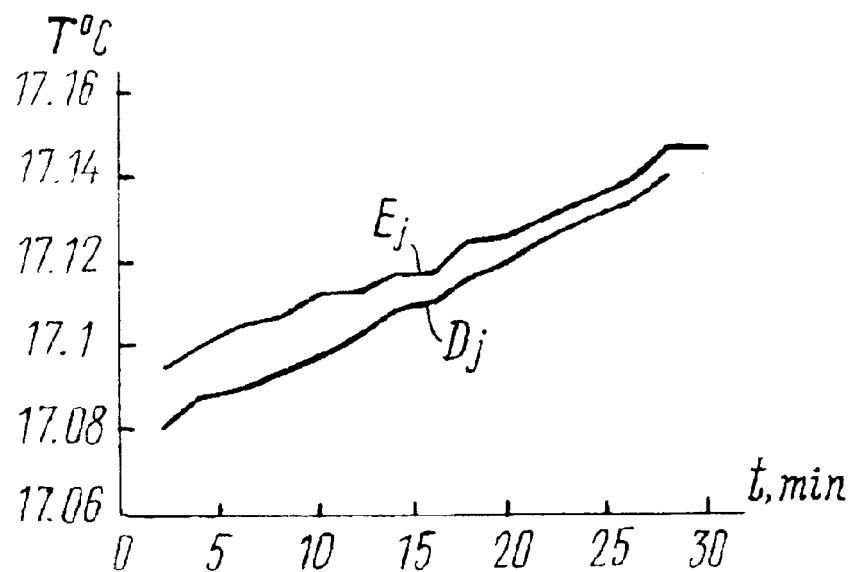
Figure 9B:
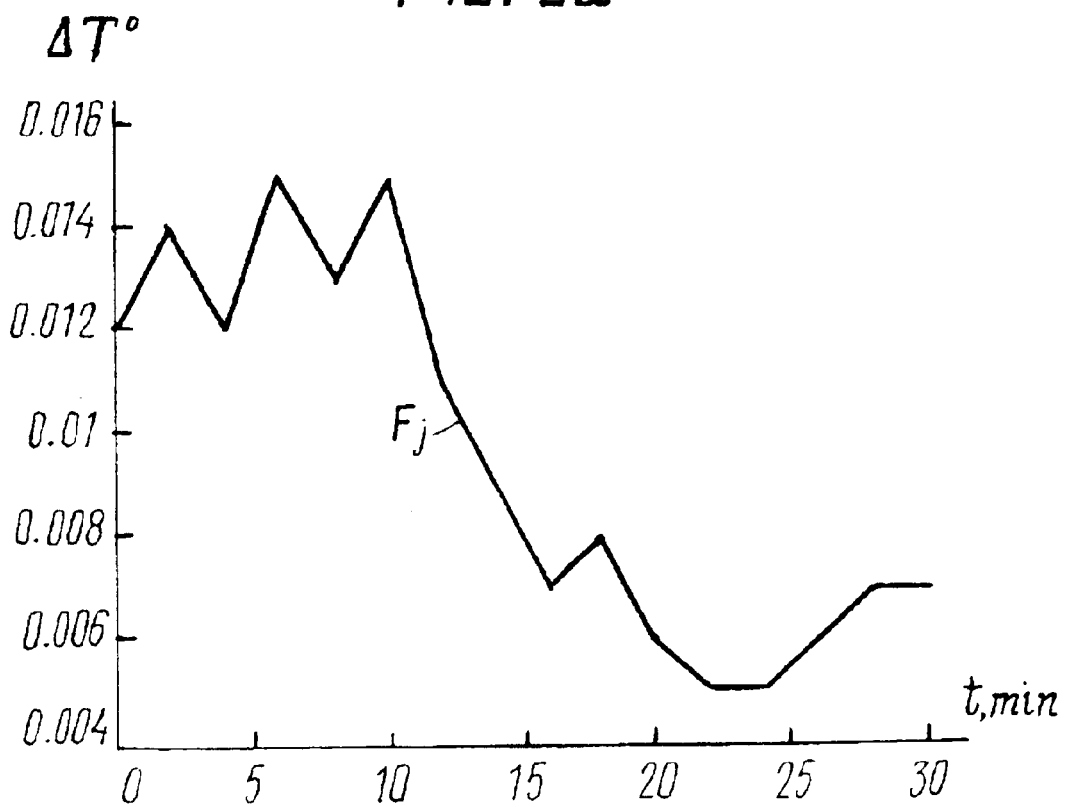

FIG. 9a illustrates Test 5.2 with application of 20 kV voltage, $\mu E = 7.2 \cdot 10^6$ D·V/m. Here D is the temperature in the working cell, E is the temperature in the comparison cell.

FIG. 9c is a plot of $\Delta T = T_{comp} - T_w$.

Test 6.1 without application of voltage corresponds to the plot in FIG. 8a.

Figure 10A:
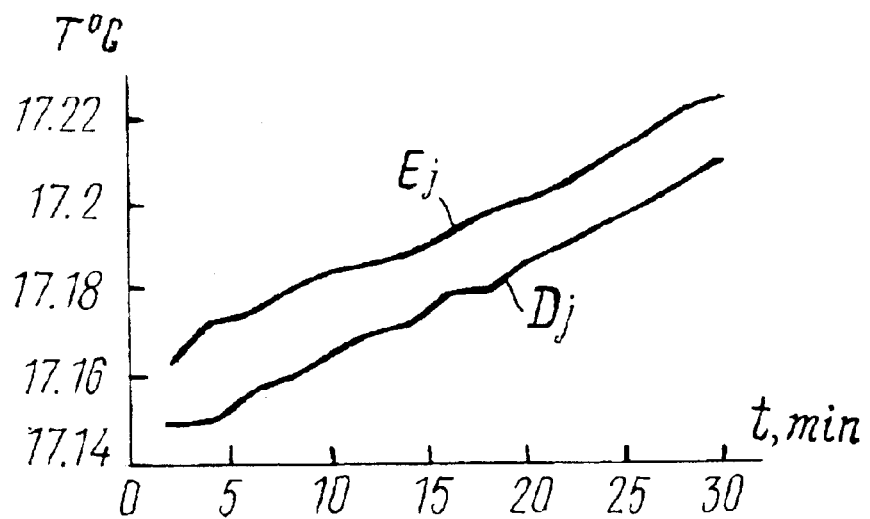

FIG. 10a illustrates Test 6.2 with application of 30 kV voltage, $\mu E = 1.08 \cdot 10^7$ D·V/m. Here D is the temperature in the working cell, E is the temperature in the comparison cell.

Figure 10B:
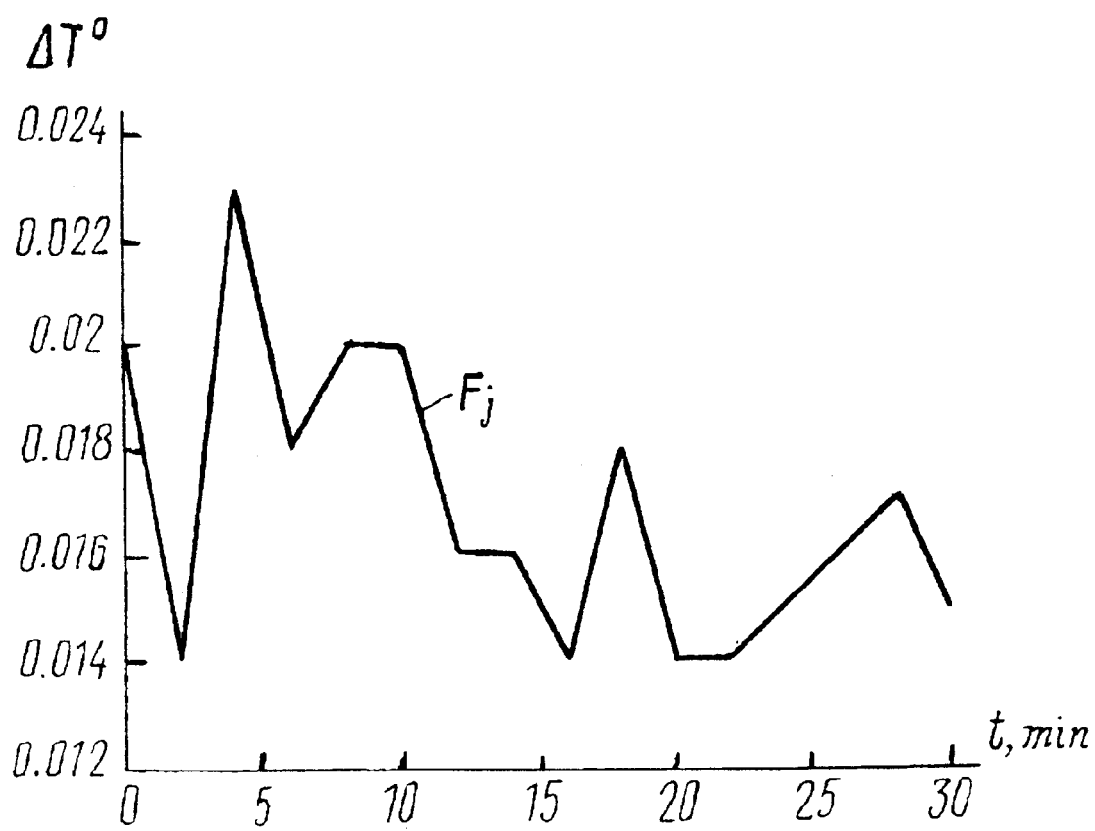

FIG. 10b is a plot of $\Delta T = T_{comp} - T_w$.

In tests 7 to 9, the positions of thermometers were changed.

Figure 11A:
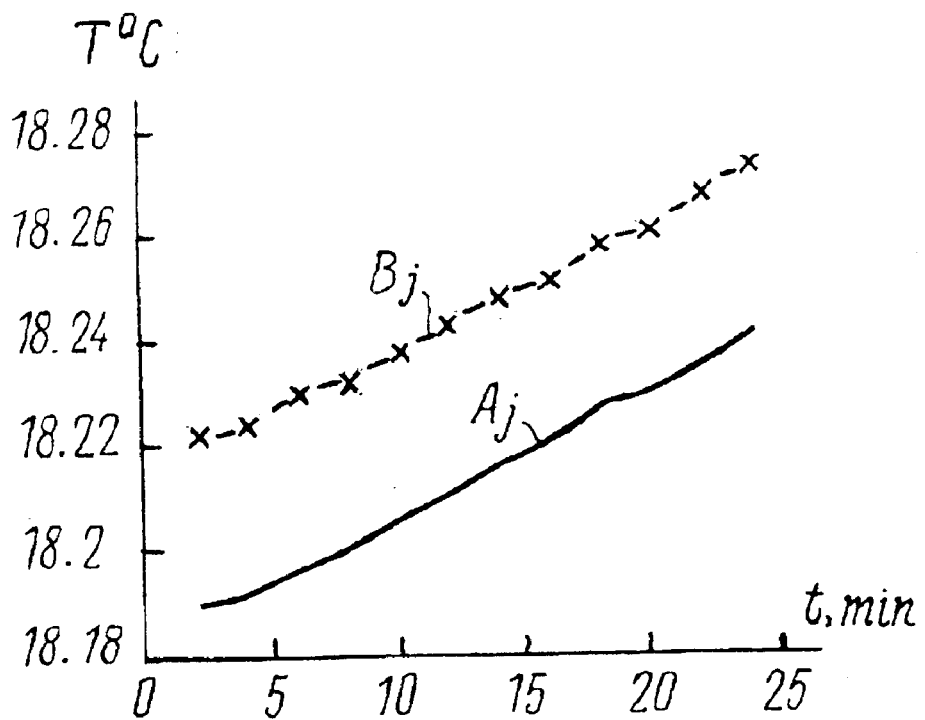

FIG. 11a illustrates Test 7.1 without application of voltage. Here A is the temperature in the working cell, B is the temperature in the comparison cell.

Figure 11B:
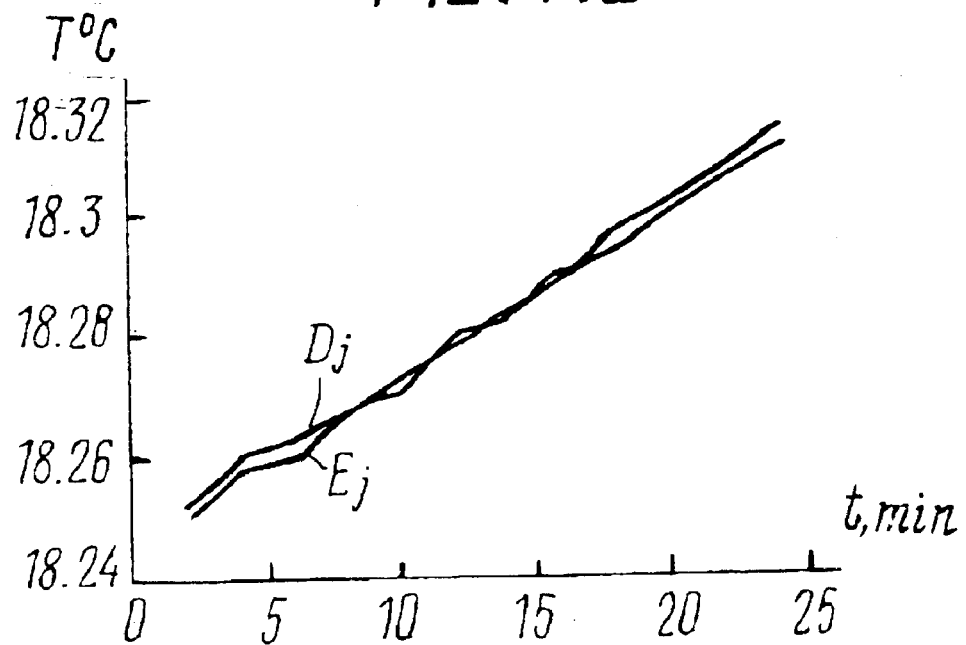

FIG. 11b illustrates Test 7.2 with application of 10 kV voltage, $\mu E = 3.6 \cdot 10^6$ D·V/m. Here D is the temperature in the working cell, E is the temperature in the comparison cell.

Figure 11C:
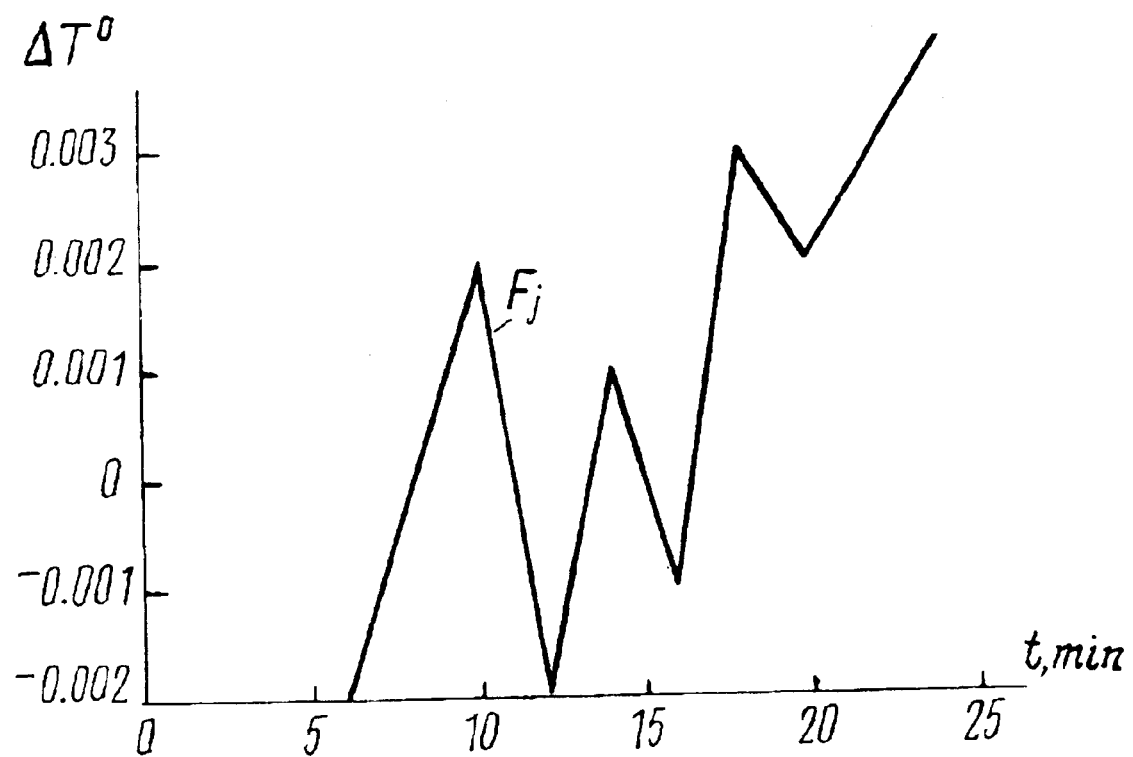

FIG. 11c is a plot of $\Delta T = T_{comp} - T_w$.

Test 8.1 without application of voltage corresponds to the plot in FIG. 11a.

Figure 12A:
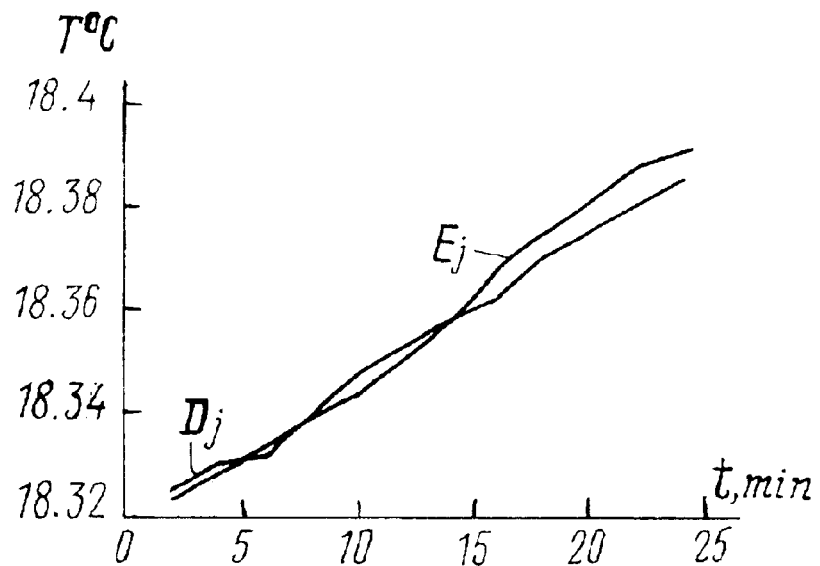

FIG. 12a illustrates Test 8.2 with application of 20 kV voltage, $\mu E = 7.2 \cdot 10^6$ D·V/m. Here D is the temperature in the working cell, E is the temperature in the comparison cell.

Figure 12B:
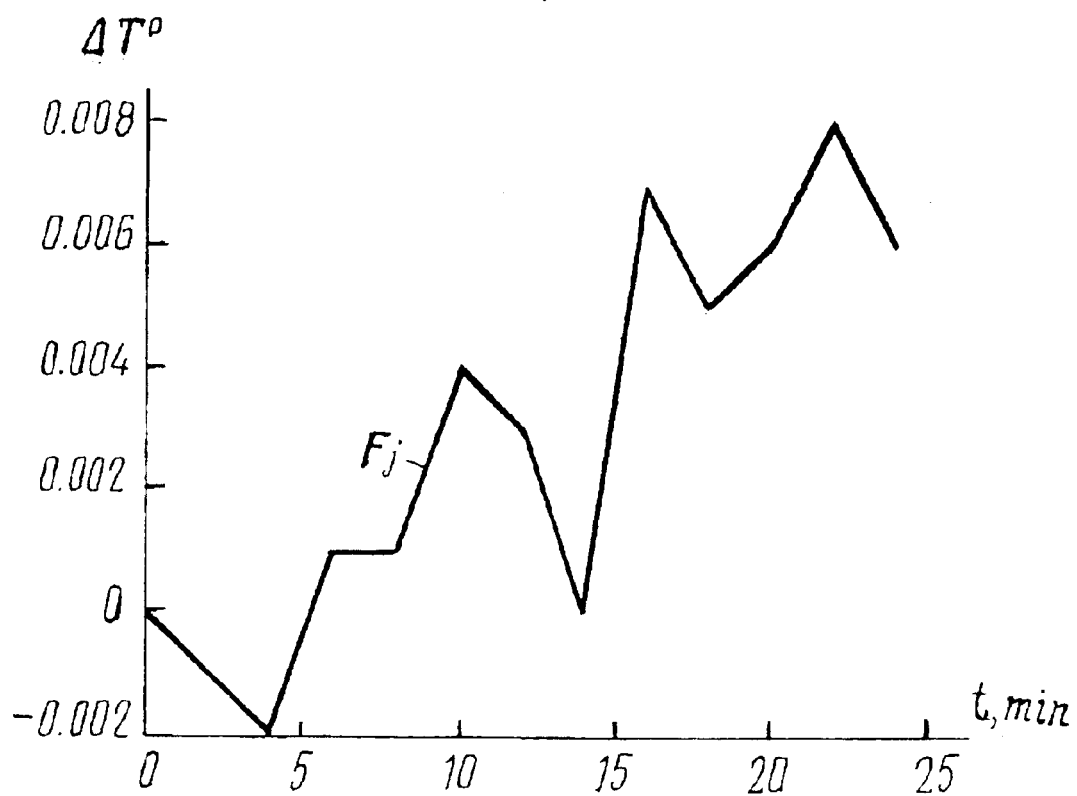

FIG. 12b is a plot of $\Delta T = T_{comp} - T_w$.

Test 9.1 without application of voltage corresponds to the plot in FIG. 11a.

Figure 13A:
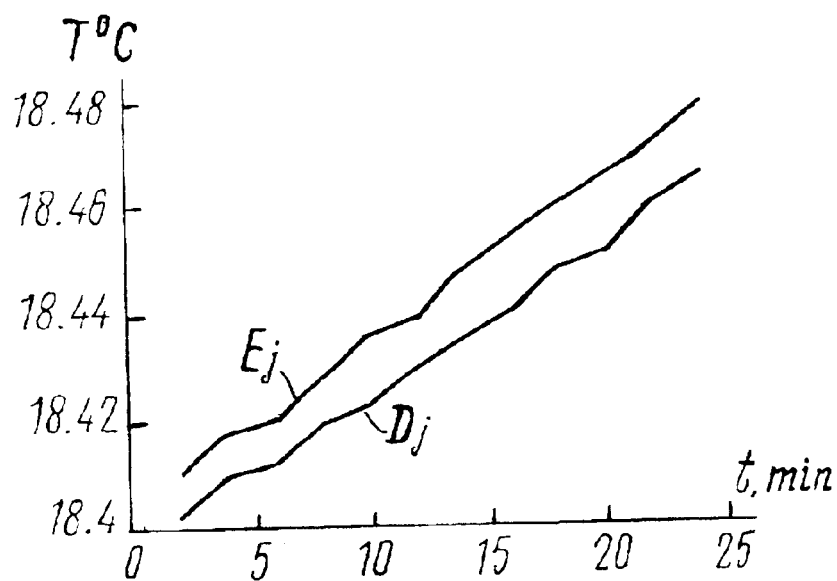

FIG. 13a illustrates Test 9.2 with application of 30 kV voltage, $\mu E = 1.08 \cdot 10^7$ D·V/m. Here D is the temperature in the working cell, E is the temperature in the comparison cell.

Figure 13B:
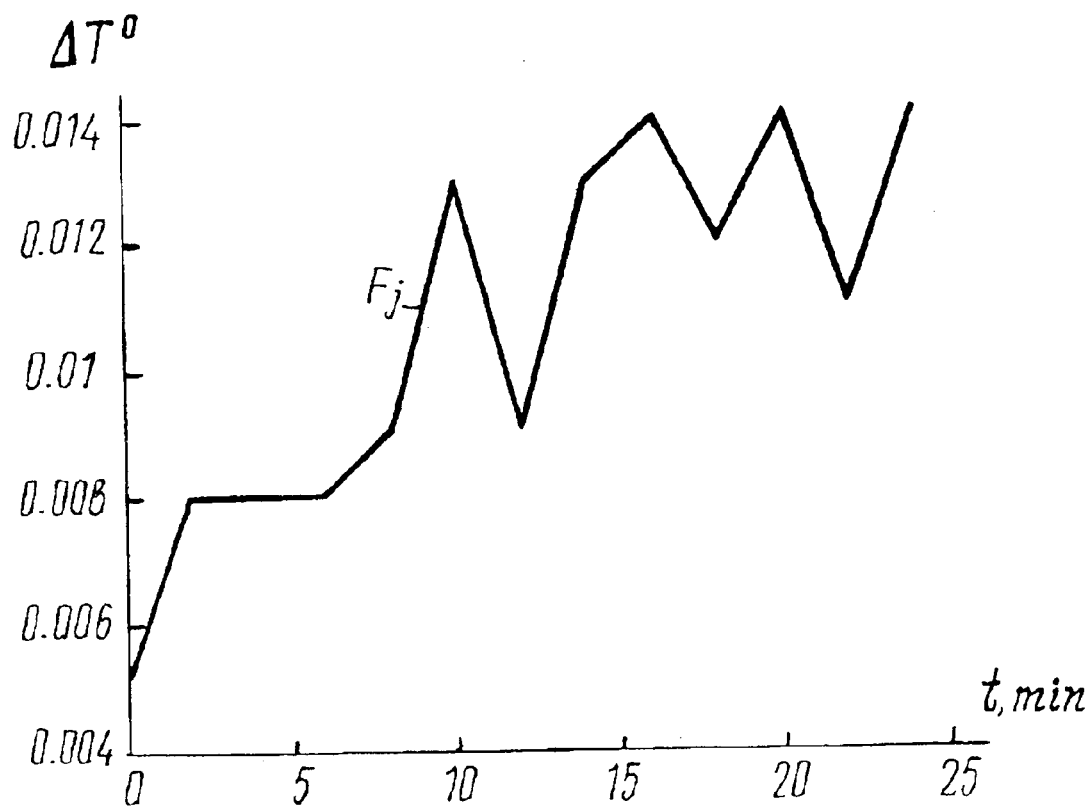

FIG. 13b is a plot of $\Delta T = T_{comp} - T_w$.

INDUSTRIAL APPLICABILITY

Experimental working-off and theoretical backgrounds have demonstrated a number of problems on the path to the use of a refrigerator/generator in industry and household.

1. The high electric field intensity value (about $10^7$ V/m) is provided by the use of high-voltage sources (about 10 kV), which is, as such, a big danger both in industry and in household especially. In addition to the conventional use of high-voltage protection measures, the problem can be resolved by miniaturization of the working chamber and the use, as a field source, of a double electric layer (with an intensity of up to $10^8$ V/m) created at the liquid-solid interface in colloid systems.

2. The working medium leaving the working chamber has a low percentage of radiation. This is caused by design features of the cell for creating the working zone with high electric field intensity. The problem can be completely resolved by either making the conducting components of materials having a low absorption at the Stark frequencies, or making the conducting components sufficiently thin for appreciative absorption of radiation. Another way to provide a great heat removal from the working medium to a coolant is to achieve the working medium condensation temperature in the process of cooling. Heat can be also efficiently removed by a coolant with a working temperature near the boiling point. It appears that an effective way is to select a working medium and a coolant so that to overlap the processes of condensation of a working medium and vaporization of a coolant. The working medium and the coolant can be the same substance.

3. Selection of a substance to be used as a working medium is based on the following aspects: a majority of substances, molecules of which exhibit a great dipole moment, are either solids in normal conditions, or quite toxic substances. That is why the observance of all of the three criteria for selection of a working medium, namely: a great dipole moment of the substance molecules, low toxicity of the substance, and the condensation temperature not higher than the temperature of the environment under a normal pressure, severely restricts the range of compounds suitable for this purpose. One of possible solutions of the problem is to choose freons. Among a wide variety of freons used in industry, one can select those observing the dipole moment criterion, being gases at normal conditions, and being ozone-friendly substances, the leakage of which will not pollute the environment.

However, solution of the aforementioned problems is not crucial for implementing the invention, and the present invention can be employed in industry and household for designing refrigerating machines, microwave generators and heat machines.

What is claimed is:

1. A method for cooling a working medium, said working medium being a gas, comprising the steps of:

generating electrical field in a closed working zone, placing the working medium, molecules of which exhibit a stable dipole moment, into said closed working zone of electrical field effect, preventing passage of electric current through said closed working zone, wherein said electric field having an intensity satisfying a condition:

$$\mu E > 10^7 \text{ D V/m}$$

where: $\mu$ is a dipole moment of the working medium molecules, i Debyes (D),

E is an electric field intensity, in V/m.

2. The method according to claim 1, wherein cooling said working medium leads to condensation of said working medium and generation of the liquid phase of said working medium, which is removed from said closed working zone of electric field.

3. The method according to claim 1, wherein said electric field has a time-variable magnitude.

4. An apparatus for cooling a working medium, said working medium being a gas, comprising:

a chamber for placing a working medium, molecules of which exhibit a stable dipole moment, said chamber including means for applying a potential difference for generating electric field in said chamber, working medium supply means connected to the chamber, working medium removal means connected to the chamber, and a DC high voltage source or AC high voltage source connected to said means for applying said potential difference, wherein said electric field having a maximal intensity satisfying a condition:

$$\mu E > 10^7 \text{ D V/m}$$

where $\mu$ is a dipole moment of the working medium molecules, in Debyes (D),

E is maximal electric field intensity, in V/m.

5. The apparatus according to claim 4, wherein said means for applying said potential difference comprises coaxial cylinders.

6. A method for generating microwave radiation, comprising the steps of:

generating electrical field in a closed working zone, placing a working medium, molecules of which exhibit a stable dipole moment, into said closed working zone of electrical field effect, wherein said electric field having an intensity satisfying the condition:

$$\mu E > 10^7 \text{ D V/m}$$

where: $\mu$ is the dipole moment of the working medium molecules, in Debyes (D), E is the electric field intensity, in V/m;

preventing passage of electric current through said closed working zone of electrical field effect, providing exit for microwave radiation from said closed working zone of electrical field effect, and removing heat through absorption of the microwave radiation by an external coolant.

7. The method according to claim 6, wherein said working medium is a gas.

8. The method according to claim 6, wherein said working medium is a liquid.

9. The method according to claim 6, wherein said external coolant is a substance having a composition corresponding to the composition of the working medium.

10. A method for cooling a working medium comprising the steps of:

placing the working medium, molecules of which exhibit a stable dipole moment, into a closed working zone of electrical field effect, wherein said electric field is generated in a double electric layer at an interface between phases of said working medium and structural components of said closed working zone of electric field effect, wherein said electric field having an intensity satisfying a condition:

$$\mu E > 10^7 \text{ D V/m}$$

where: $\mu$ is a dipole moment of the working medium molecules, in Debyes (D),

E is an electric field intensity, in V/m;

wherein the passage of electric current through said closed working zone is prevented.

* * * * *